No. 668,888. Patented Feb. 26, 1901.
J. F. STANDIFORD.
MULTIPLYING PHOTOGRAPHIC CAMERA.
(Application filed June 9, 1900.)

(No Model.) 3 Sheets—Sheet 1.

WITNESSES:

INVENTOR
Jacob F. Standiford.
BY
ATTORNEYS

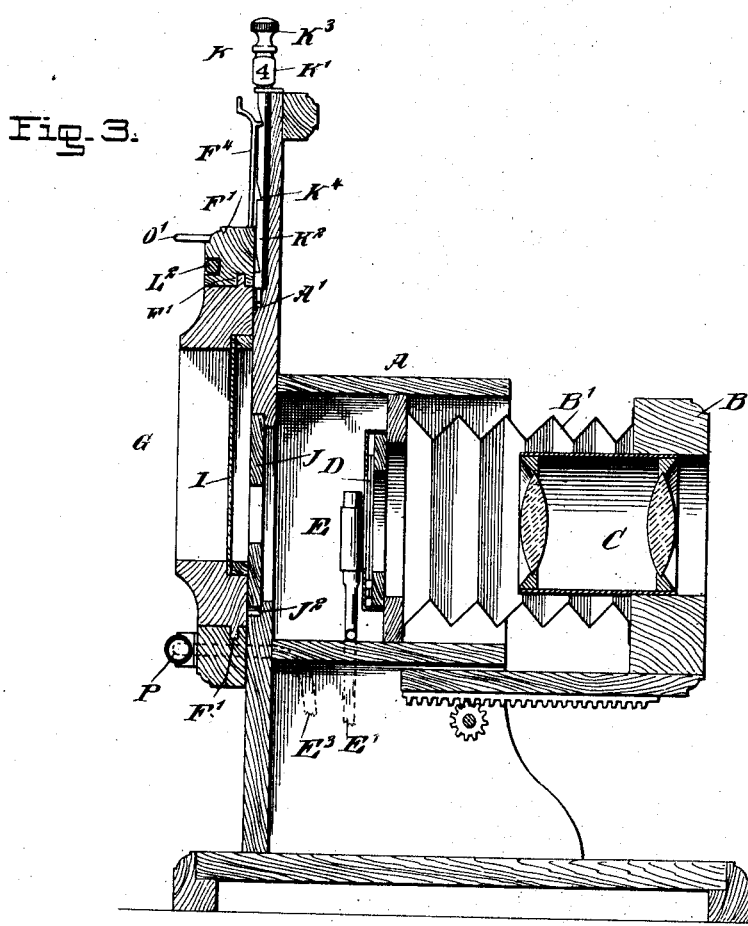

No. 668,888. Patented Feb. 26, 1901.
J. F. STANDIFORD.
MULTIPLYING PHOTOGRAPHIC CAMERA.
(Application filed June 9, 1900.)
(No Model.) 3 Sheets—Sheet 3.
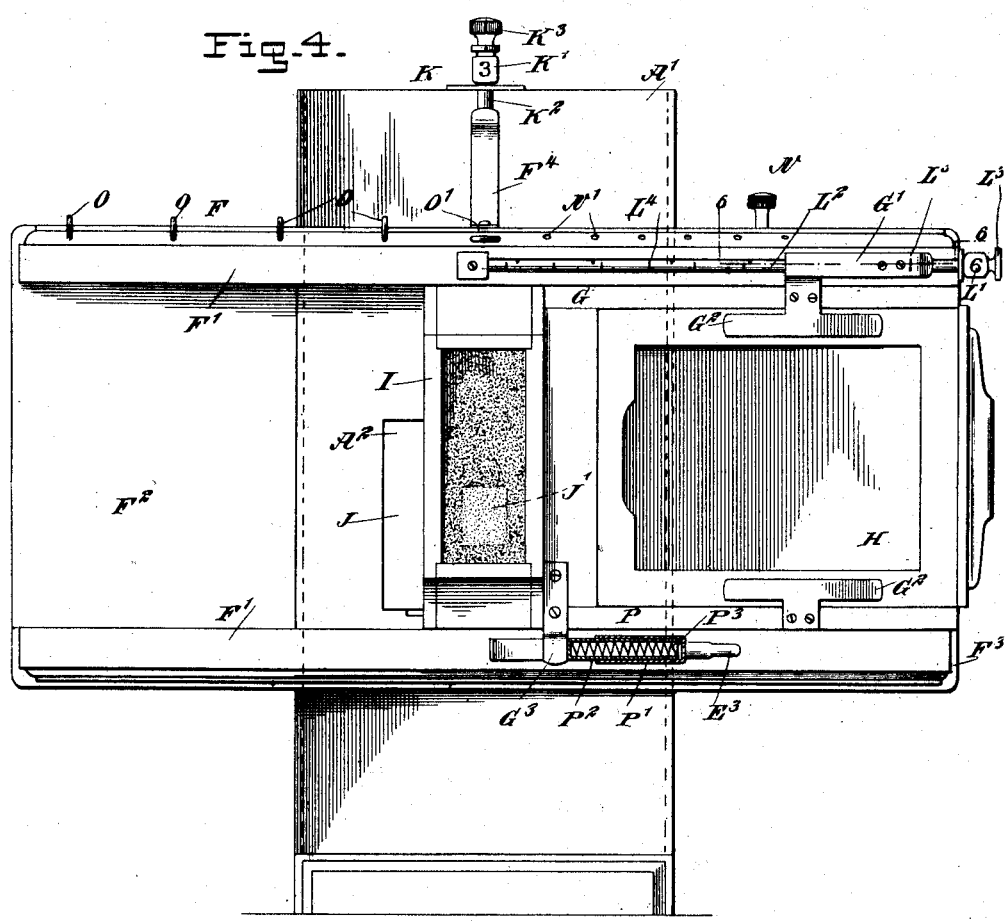
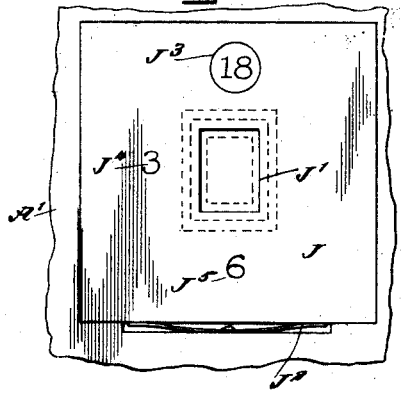
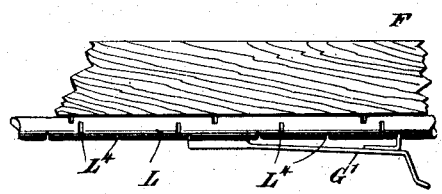
WITNESSES:
INVENTOR
Jacob F. Standiford.
BY
ATTORNEYS

UNITED STATES PATENT OFFICE.

JACOB F. STANDIFORD, OF FORT SCOTT, KANSAS.

MULTIPLYING PHOTOGRAPHIC CAMERA.

SPECIFICATION forming part of Letters Patent No. 668,888, dated February 26, 1901.

Application filed June 9, 1900. Serial No. 19,710. (No model.)

*To all whom it may concern:*

Be it known that I, JACOB F. STANDIFORD, a citizen of the United States, and a resident of Fort Scott, in the county of Bourbon and State of Kansas, have invented a new and Improved Multiplying Photographic Camera, of which the following is a full, clear, and exact description.

The object of the invention is to provide a new and improved multiplying photographic camera arranged to permit of making a desired number of exposures on a single plate, to permit the withdrawal of the plate-holder slide after the insertion of the plate-holder in the carriage, and to cause the shutter to automatically open and close upon moving the ground glass into or out of focusing position without requiring reinsertion of the slide and without danger of exposing the plate to the action of light during said movement of the ground glass.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
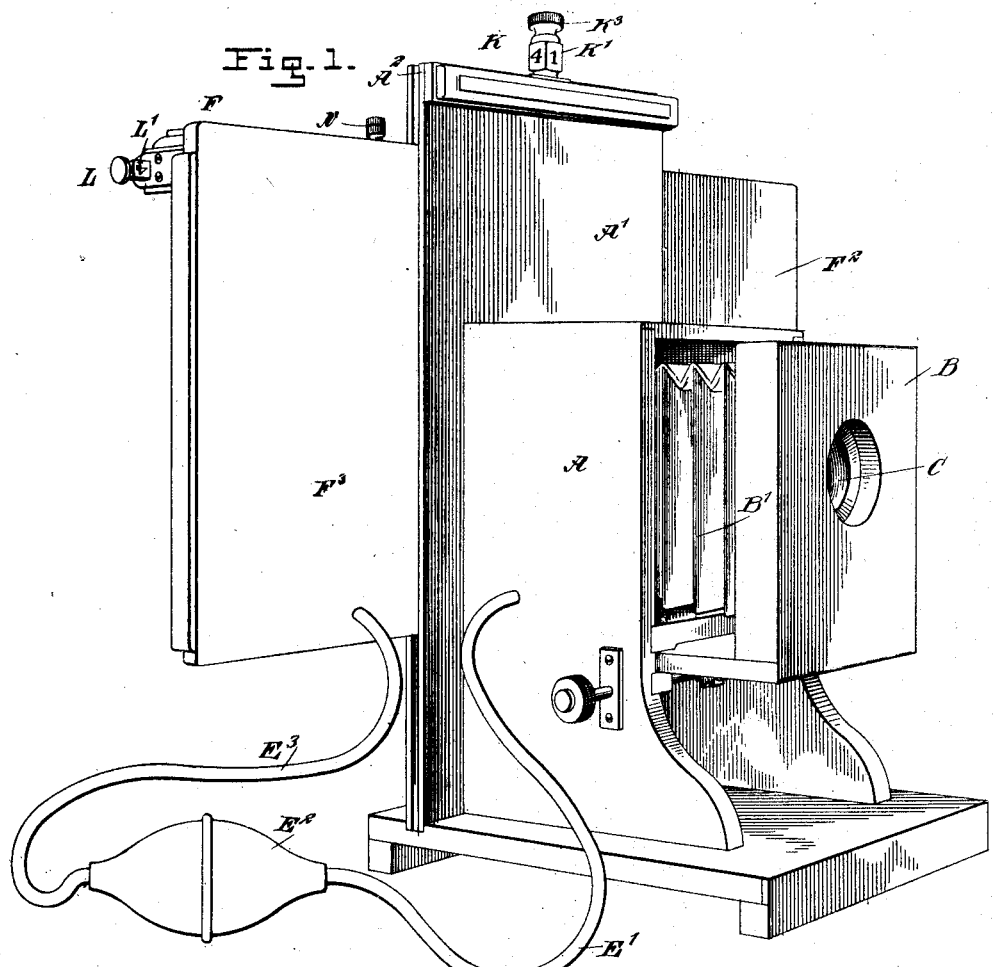
Figure 2:
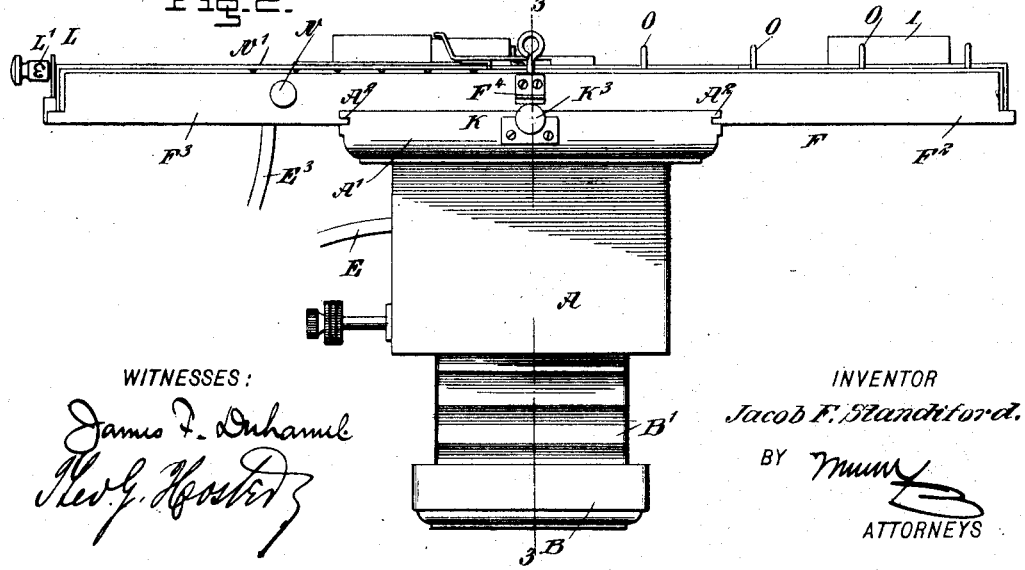

Figure 1 is a perspective view of the improvement. Fig. 2 is a plan view of the same. Fig. 3 is a longitudinal sectional elevation of the same on the line 3 3 in Fig. 2. Fig. 4 is a rear end view of the improvement with the ground glass in focusing position. Fig. 5 is a rear end view of the camera-casing with an interchangeable size-plate in position, and Fig. 6 is a sectional plan view of part of the carrier on the line 6 6 in Fig. 4.

The improved multiplying photographic camera is provided with the usual casing A, the focusing-head B having a bellows extension B' and carrying a lens C, in the rear of which is located, within the casing A, a shutter D of any approved construction and actuated by a pneumatic actuating device E, having a hose E', leading to the outside of the casing, a bulb E² being on said hose for enabling the operator to open and close the shutter upon compressing or releasing the bulb for making the desired exposure in the usual manner. The back A' of the casing A is extended upward and downward above the top and bottom of said casing, and guideways A² are formed in the sides of said back A' for the carrier-frame F to slide in a vertical direction, said carrier-frame F being provided on its rear face with transversely-extending guideways F' for a carrier G to move transversely in, said carrier G being arranged to receive and support a removable plate-holder H, of any approved construction, and said carrier G permanently carries a ground glass I to permit of focusing. The inner frame F is formed with extensions F² and F³, extending beyond the sides of the back A', as plainly shown in Figs. 1, 2, and 4.

In the back A' of the casing A is arranged an opening A³ for the insertion of one of a series of size-plates J, each formed with an opening J' in alinement with the focusing plane of the lens C, the size-plate J resting at its lower end on a spring J², which holds the size-plate in position in the back A', as will be readily understood by reference to Figs. 3 and 5. The openings J' in the different size-plates are of such dimensions as to permit of making a desired number of exposures on a single plate in the holder H, and each of the said size-plates is provided on its rear face with an indicating-mark J³ in the form of a numeral indicating the number of exposures on the sensitive plate possible to this particular size-plate J. Thus, as shown in Fig. 5, the mark J³ indicates "18"—that is, with the opening J' eighteen exposures can be made on the sensitive plate in the holder H. At the left of the opening J' is another indicating-mark J⁴, and a similar mark J⁵ is on the lower portion of said size-plate J. The mark J⁴ indicates how many exposures can be made in a vertical row on the sensitive plate in the holder H, and the mark J⁵ indicates how many vertical rows of exposures are possible on the sensitive plate in said holder H. Thus as shown in Fig. 5 three exposures are possible for each vertical row, and six rows of exposures can be made on the sensitive plate in the holder, thereby making the eighteen exposures above referred to and indicated by the mark J³. The mark J⁴ also operates in conjunction with a corresponding mark K' on an indicator K, and the mark $J^5$ operates in conjunction with a similar mark $L'$ on an indicator L.

The indicator K is provided with a vertically-disposed rod $K^2$, mounted to turn in suitable bearings in the back $A'$, a knurled head $K^3$ being at the upper end of said rod to permit the operator to conveniently turn said rod $K^2$ and display the mark $K'$ according to the indicating-mark $J^4$ on the size-plate J to be used at the time. The rod $K^2$ is provided with sets of notches $K^4$, adapted to be engaged by a catch $F^4$, secured to the top of the carrier-frame F, it being understood that each set of notches has as many notches as is indicated by the numeral at the mark $K'$. Thus when the numeral 3 is displayed, as shown in Fig. 4, then the set of notches having three notches is at the front for engagement with the catch $F^4$. Now by shifting the carrier-frame F up or down three divisions are made of the sensitive plate in the holder—that is, three different portions of the sensitive plate are brought into the field of exposure upon engaging the catch $F^4$ with the several notches $K^4$ in action at the time.

The indicator L is provided with a similar rod $L^2$, formed with a head $L^3$ and journaled in suitable bearings on the upper guideway $F'$ of the carrier-frame F. This rod $L^2$ is provided with sets of notches $L^4$, adapted to be engaged by a catch $G'$, secured to the carrier G, the latter being also provided with holding means $G^2$ for retaining the plate-holder H in position. By turning the head $L^3$ the rod $L^2$ is moved in such a position that a set of notches $L^4$ is at the front to be engaged by the catch $G'$, said rod being also provided with an outermost set of notches $L^5$ for engagement by said catch $G'$ to retain the carrier G in position at the time the ground glass I is in the field of exposure. (See Fig. 4.)

When using the device the plate-holder H is placed in position on the carrier G, and then the inner plate-holder slide is removed, so that the sensitive plate is in position for exposure as soon as the carrier G is moved transversely to the field of exposure at the opening $J'$ in the size-plate J. When the carrier G is in a right-hand position, as shown in Fig. 4, then the sensitive plate is at the rear of the extension $F^3$, and consequently is protected from exposure during the time the ground glass I is in the field of exposure to permit of focusing in the usual manner. When the proper focus has been obtained, the operator shifts the carrier G to the right, so as to bring the sensitive plate into the field of exposure at the rear of the opening $J'$. The shutter is now manipulated by the operator to make the exposure—that is, the shutter is opened and closed in the usual way by pressing and releasing the bulb $E^2$. After the exposure has been made the carrier G is again moved to the right, so as to bring the ground glass I again into the field of exposure for focusing another subject previous to making the exposure on the sensitive plate, as before explained, it being understood that for the second exposure the carrier is shifted so as to engage the catch $G'$ with another notch of the set of notches $L^4$ used at the time.

In order to automatically open and close the shutter upon moving the carrier G, so as to bring the ground glass I into or out of the field of exposure, I provide the following device: On the lower guideway $F'$ of the carrier-frame F is arranged an air-pump P, consisting, essentially, of a cylinder $P'$, in which operates a plunger $P^2$, pressed on by a spring $P^3$ for holding the plunger normally in an outermost position, the outer end of said plunger being adapted to be engaged by a lug $G^3$ on the carrier G, so that when the latter is moved to the right the lug $G^3$ pushes the plunger $P^2$ inward against the tension of the spring, so as to pump air into the end $E^3$ of the tube or hose $E'$, connected with the shutter-actuating mechanism E, whereby the shutter is moved into an open position as soon as the ground glass I moves into the field of exposure. When the focusing is completed and the carrier G is moved to the left to move the ground glass out of the field of exposure and the sensitive plate into the field of exposure, then the lug $G^3$ moves away from the plunger $P^2$ and the spring $P'$ pushes the plunger outward, so as to suck the air in the tube $E^3$, bulb $E^2$, tube $E'$, and the shutter-actuating device E, to cause the shutter to close before the sensitive plate moves into the field of exposure. From this it will be seen that the shutter is automatically opened when the ground glass I is moved into the field of exposure and is automatically closed when the ground glass moves out of the field of exposure and previous to the sensitive plate moving into the field of exposure.

For making the exposure after the sensitive plate is in the field of exposure the operator has to press and release the bulb $E^2$ in the usual manner.

In order to enable the operator to keep track of the exposed plates on the sensitive plate, I provide a pin N, adapted to be inserted in apertures $N'$, formed on the upper guideway $F'$ of the carrier-frame F, (see Fig. 4,) it being understood that the operator shifts the pin N from one aperture to another after an exposure is made.

In order to facilitate moving the carrier G in the carrier-frame, I provide the upper guideway $F'$ with screw-eyes or other projections O, adapted to be taken hold of by the operator with one finger of his hand, while the other fingers engage a projecting side of the frame of the ground glass I to conveniently move the carrier G to the desired position. A similar projection $O'$ is arranged at the middle of the upper guideway $F'$ to permit of conveniently lifting or lowering the carrier-frame F for the purpose previously mentioned.

Although I have shown and described my improvement as a complete multiplying-camera, it is evident that the improvement may be made in the form of a removable back arranged for attachment to any portrait or other camera and take the place of the regular plate-holder.

Having thus fully described my invention, I claim as new and desire to secure by Letters Patent—

1. A multiplying-camera provided with a shutter and a device for automatically opening and closing the shutter, the said device being movable across the field of exposure, as set forth.

2. A multiplying-camera, comprising a casing provided with a back having an opening in the field of exposure, a carrier-frame slidable on said back and having side extensions, a carrier mounted to slide in said carrier-frame and provided with means for receiving and holding the plate-holder, and a ground glass on the said carrier and spaced from the sensitive plate in the plate-holder a sufficient distance to permit of shifting the carrier past the field of exposure without having both the ground glass and sensitive plate in the field of exposure at the same time, the arrangement being such that when the ground glass is in the field of exposure the sensitive plate is at the rear of one of the side extensions of the carrier-frame, and is protected from exposure, as set forth.

3. A multiplying-camera having an indicator and holding-rod mounted to turn and having sets of spaced notches lengthwise of the rod, the rod being round and having at or near one end a portion square in cross-section and provided with indicating-marks on the faces of the square portion of the rod, the said indicating-marks being in alinement with the corresponding set of notches, to indicate the number of notches in a set of notches, as set forth.

4. A multiplying photographic camera, comprising a casing, a carrier-frame slidable thereon, a carrier arranged for removably holding the plate-holder and mounted to slide on the carrier-frame at a right angle to the line of movement of said carrier-frame, means for adjusting the carrier-frame and the carrier to graduated positions, and for holding the said carrier-frame and carrier in said positions, a ground glass on the carrier, a shutter, and means controlled by the carrier for actuating the shutter, substantially as shown and described.

5. A multiplying photographic camera, comprising a casing, a carrier-frame slidable thereon, a carrier arranged for removably holding the plate-holder and mounted to slide on the carrier-frame, means for adjusting the carrier-frame and the carrier to graduated positions, and for holding the said carrier-frame and carrier in said positions, a ground glass on said carrier and spaced from the sensitive plate in the plate-holder when the latter is in position in the carrier and its slide is removed, to permit of adjusting the carrier-frame to bring the same alternately to focusing and exposure positions, with the plate-holder slide removed, and means for retaining the carrier in position when the ground glass is in the field of exposure.

6. A multiplying photographic camera having a movable plate-holder carrier with a ground glass, and a shutter controlled by said carrier, to automatically open the shutter when the ground glass moves into focusing position, and to automatically close the shutter when the ground glass moves out of focusing position, as set forth.

7. A multiplying photographic camera having a shutter, a movable carrier having a ground glass attached thereto, means for removably holding the plate-holder, said carrier being arranged for movement across the field of exposure to bring either the ground glass or the sensitive plate into the field of exposure, and pneumatic means controlled by said carrier for actuating the said shutter, to open the latter upon moving the carrier in one direction and bring the ground glass into the field of exposure, and to close the shutter upon moving the carrier in an opposite direction, to move the ground glass out of the field of exposure.

8. A multiplying photographic camera having a shutter, a movable carrier having a ground glass attached thereto, means for removably holding the plate-holder, said carrier being arranged for movement across the field of exposure to bring either the ground glass or the sensitive plate into the field of exposure, and pneumatic means controlled by said carrier for actuating the said shutter, to open the latter upon moving the carrier in one direction and bring the ground glass into the field of exposure, and to close the shutter upon moving the carrier in an opposite direction, said means comprising an air-pump having a cylinder, a spring-pressed plunger for the same, a part moving with the carrier for engaging the plunger and moving the same in one direction against the tension of the plunger-spring, a shutter-cylinder and piston connected with the pump-cylinder, and a connection between the shutter-piston and the shutter, substantially as shown and described.

9. A multiplying photographic camera, comprising a casing having a back extending upward and downward from the top and bottom of the casing, the said back being provided with an opening in the field of exposure, graduated size-plates for insertion in said back-opening, a carrier-frame slidable vertically on said back and having side extensions extending beyond the sides of the back and transverse guideways, a carrier mounted to slide on said carrier-frame and having a ground glass, means for removably holding the plate-holder, indicator and holding-rods mounted to turn on said back and said carrier-frame, said rods having sets of notches, and catches on said carrier-frame and said carrier, to engage said notches, as set forth.

10. A multiplying photographic camera, comprising a casing having an extended back with an opening in the field of exposure, graduated size-plates for insertion in said back-opening, a carrier-frame slidable vertically on said back and having side extensions and transverse guideways, a carrier mounted to slide on said carrier-frame and having a ground glass, means for removably holding the plate-holder, indicator and holding-rods mounted to turn on said back and said carrier-frame, said rods having sets of notches, catches on said carrier-frame and said carrier, to engage said notches, indicating means on said size-plates and said rods, for indicating the position of the rods relatively to the size-plate in use at the time, one of said rods being provided with a second set of notches near one end for engagement by the catch when the ground glass is in the field of exposure, as set forth.

11. A multiplying photographic camera, provided with an apertured size-plate having a mark on its rear face for indicating the number of exposures possible for a sensitive plate, and marks on said size-plate for indicating respectively the number of exposures that can be made in a vertical row on the sensitive plate, and the number of vertical rows of exposures possible on said sensitive plate, substantially as shown and described.

12. A multiplying photographic camera, provided with an apertured size-plate having a mark on its rear face indicating the number of exposures possible for a sensitive plate, marks on said size-plate for indicating respectively the number of exposures that can be made in a vertical row on the sensitive plate, and the number of vertical rows of exposures possible on the sensitive plate, and indicators acting in conjunction with the latter marks and provided with corresponding marks for indicating the positions at which the indicators have to be set, substantially as shown and described.

In testimony whereof I have signed my name to this specification in the presence of two subscribing witnesses.

JACOB F. STANDIFORD.

Witnesses:
R. B. CAMPBELL,
C. H. OSBUN.